United States Patent
Henstrom et al.

(10) Patent No.: US 6,304,953 B1
(45) Date of Patent: *Oct. 16, 2001

(54) COMPUTER PROCESSOR WITH INSTRUCTION-SPECIFIC SCHEDULERS

(75) Inventors: Alexander Paul Henstrom, Beaverton; David J. Sager, Portland, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,657

(22) Filed: Jul. 31, 1998

(51) Int. Cl.[7] .................................................... G06F 15/82
(52) U.S. Cl. .......................... 712/215; 712/23; 712/214; 712/216; 712/217
(58) Field of Search .................................. 711/117, 116; 712/23, 215, 216, 217, 218, 219, 214

(56) References Cited

U.S. PATENT DOCUMENTS

| | | | |
|---|---|---|---|
| 5,408,658 | * | 4/1995 | Rechtschaffen et al. ............. 712/216 |
| 5,479,622 | * | 12/1995 | Grohoski et al. ..................... 712/215 |
| 5,592,679 | * | 1/1997 | Yung ....................................... 712/23 |
| 5,651,125 | * | 7/1997 | Witt et al. ............................. 712/218 |
| 5,751,983 | * | 5/1998 | Abramson et al. .................. 712/216 |
| 5,761,475 | * | 6/1998 | Yung et al. ............................ 712/218 |
| 5,778,210 | * | 7/1998 | Henstrom et al. .................... 712/218 |
| 5,796,975 | * | 8/1998 | Lesartre et al. ....................... 712/218 |
| 5,835,745 | * | 11/1998 | Sager et al. ........................... 712/215 |
| 5,842,036 | * | 11/1998 | Hinton et al. ........................... 712/23 |
| 6,035,389 | * | 3/2000 | Grochowski et al. ............... 712/216 |

OTHER PUBLICATIONS

Gurindar S. Sohi, Instruction Issue Logic for High–Performance, Interruptible, Multiple Functional Unit, Pipelined Computers, IEEE Transactions on Computers, vol. 39, No. 3, Mar. 1990, pp. 349–359.

* cited by examiner

*Primary Examiner*—Meng-Al T. An
*Assistant Examiner*—Wen-Tai Lin
(74) *Attorney, Agent, or Firm*—Kenyon & Kenyon

(57) ABSTRACT

One embodiment of the present invention is a computer processor that includes a first scheduler adapted to dispatch a first type of computer instructions, and a second scheduler coupled to the first scheduler and adapted to dispatch a second type of computer instructions. The first type of instructions all have a first latency and the second type of instructions all have a second latency. The first scheduler is skewed relative to the second scheduler so that when the first scheduler dispatches one of the first type of computer instructions having a first latency, the second scheduler will dispatch one of the second type of computer instructions that is dependent on the first type of computer instruction at a time equal to the first latency.

17 Claims, 3 Drawing Sheets

COMPUTER PROCESSOR WITH INSTRUCTION-SPECIFIC SCHEDULERS

FIELD OF THE INVENTION

The present invention is directed to a computer processor. More particularly, the present invention is directed to a computer processor with instruction-specific schedulers.

BACKGROUND OF THE INVENTION

The primary function of most computer processors is to execute computer instructions. Most processors execute instructions in the programmed order that they are received. However, some recent processors, such as the Pentium® II processor from Intel Corp., are "out-of-order" processors. An out-of-order processor can execute instructions in any order possible as the data and execution units required for each instruction becomes available. Therefore, with an out-of-order processor, execution units within the processor that otherwise may be idle can be more efficiently utilized.

The typical out-of-order processor includes a scheduler. The scheduler determines, for each instruction, when the appropriate execution unit and necessary data items for the instruction are available. When they are available, the scheduler schedules, or dispatches, the instructions.

Most known processors include a single general purpose scheduler that schedules all types of instructions. For example, the Pentium® II processor includes a single Reservation Station ("RS") that functions as a scheduler. The RS is a twenty instruction queue, and can schedule the instructions in any order. However, in addition to determining the availability of execution units and data items, the RS must track dependencies between instructions, and the latency of the instructions. For example, a second instruction that is dependent on a first instruction cannot be scheduled by the RS until the first instruction has been allowed to execute. The latency of the first instruction indicates the earliest time that the second instruction can be dispatched. Therefore, if the first instruction has a latency of four clock cycles, the RS cannot dispatch the second dependent instruction until at least four cycles after the first instruction was dispatched.

As the speed requirements of processors increase, known schedulers require more and more complex logic to properly schedule instructions. However, the added complexity can introduce undesirable delays in the processor.

Based on the foregoing, there is a need for a processor with a faster and more efficient scheduler than is found in the prior art.

SUMMARY OF THE INVENTION

One embodiment of the present invention is a computer processor that includes a first scheduler adapted to dispatch a first type of computer instructions, and a second scheduler coupled to the first scheduler and adapted to dispatch a second type of computer instructions.

DETAILED DESCRIPTION

Figure 1:
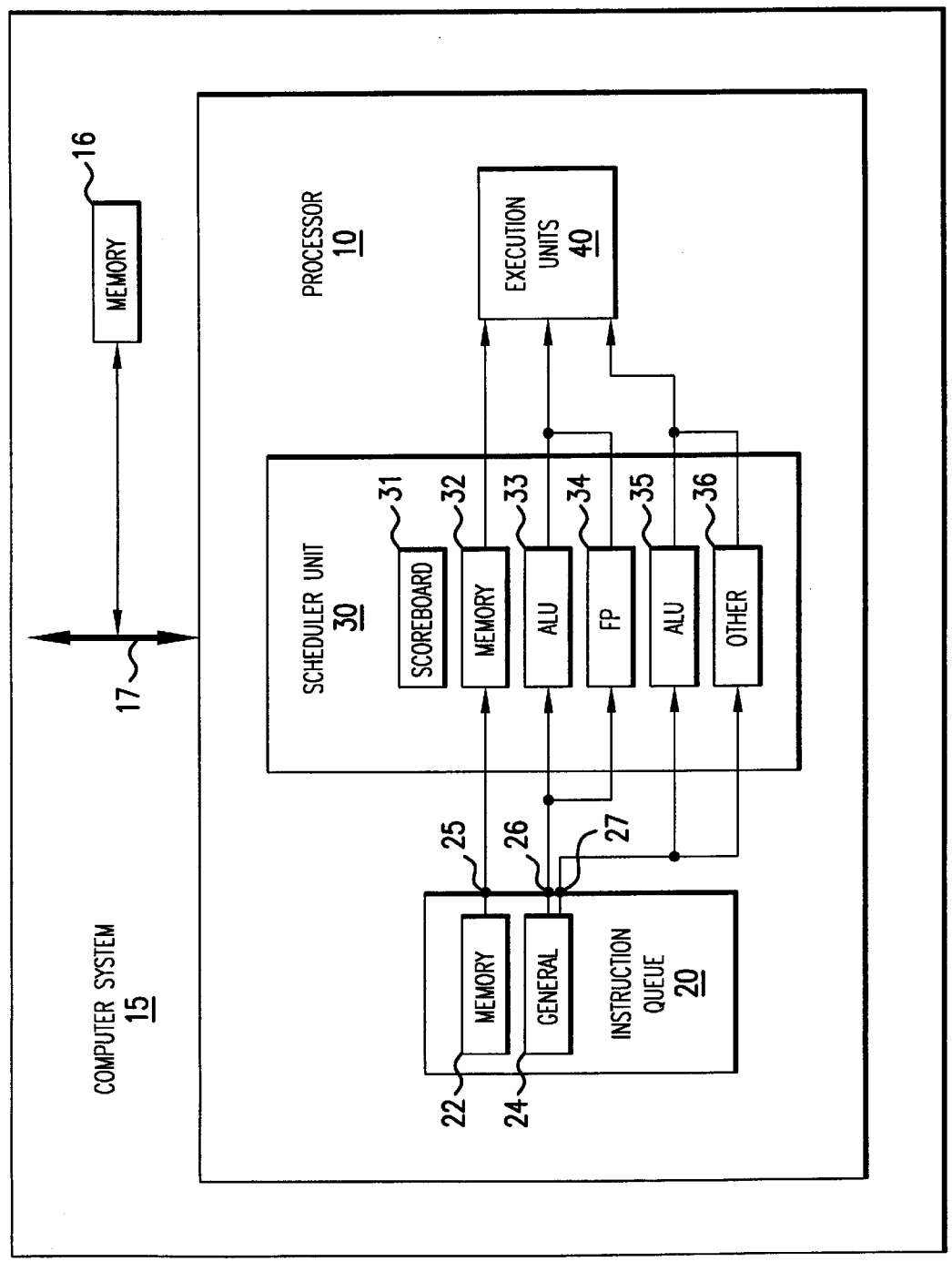
FIG. 1 is a block diagram of a processor within a computer system in accordance with one embodiment of the present invention.

FIG. 1 is a block diagram of a processor 10 in a computer system 15 in accordance with one embodiment of the present invention. FIG. 1 illustrates those functional units of processor 10 that are most relevant to the present invention. In most embodiments, processor 10 includes many other functional units not shown in FIG. 1. Processor 10 is coupled to memory 16 and other components of computer system 15 (not shown) by a bus 17.

Processor 10 includes an instruction queue 20. Instruction queue 20 receives in-order instructions from other units of processor 10, such as an instruction cache and instruction decoder (not shown in FIG. 1). The instructions are partitioned into memory instructions (e.g., load and store instructions) and general purpose instructions (e.g., arithmetic and logic instructions, and all other non-memory instructions).

Instruction queue 20 includes a memory queue 22 and a general queue 24. The memory instructions are stored in memory queue 22 and the general purpose instructions are stored in general queue 24.

In one embodiment, the instructions stored in instruction queue 20 are "micro-operations." Micro-operations are generated by translating complex instructions into simple, fixed length instructions for ease of execution.

Each instruction has two sources and a destination. The sources are the registers or locations used by the instruction to produce a result. The destination is the register to which the instruction writes the result it produces.

Instruction queue 20 is coupled to a scheduler unit 30 through three dispatch ports 25–27. Scheduler unit 30 includes five schedulers: a memory scheduler 32, a first arithmetic logic unit ("ALU") scheduler 33, a floating point ("FP") scheduler 34, a second ALU scheduler 35 and an "other" scheduler 36. Schedulers 32–36 are separated by types of instructions, or the general function of the instructions. Further, in one embodiment, schedulers 32–35 each receive instructions that have identical latencies. For example, memory scheduler 32 receives instructions that have a latency of four, ALU scheduler 33 receives instructions that have a latency of one, etc.

Instruction queue 20 further partitions the instructions into the type of instructions that correspond to schedulers 32–36. Instruction queue 20 sends each instruction to the appropriate scheduler.

Specifically, memory scheduler 32 receives only memory instructions from memory queue 22 through port 25. In one embodiment, all memory instructions have a latency of four clock cycles. ALU scheduler 33 and ALU scheduler 35 receive only ALU instructions from general queue 24 through ports 26 and 27, respectively. In one embodiment, all ALU instructions have a latency of one clock cycle. FP scheduler 34 receives only FP instructions from general queue 24 through port 26. In one embodiment, all FP instructions have a latency of twelve clock cycles. Other scheduler 36 receives all other miscellaneous instructions, including variable latency instructions (e.g., floating point divide instructions) from general queue 24 through port 27. Therefore, other scheduler 36 differs from schedulers 32–35 because the instructions in scheduler 36 are not all the same type and do not all have identical latencies.

Scheduler unit 30 further includes a scoreboard 31. Scoreboard 31 maintains the status of all registers in processor 10.

In one embodiment, schedulers 32–36 can hold eight instructions at a time. The primary function of schedulers 32–36 is to schedule and dispatch instructions to a plurality of execution units 40. Execution units 40 include a memory load execution unit, an arithmetic execution unit, etc. Execution units 40 execute the instructions.

Before dispatching an instruction, data resources, execution resources and writeback resources for that instruction must be available. Typically, a scheduler must determine the availability of these resources. However, because each scheduler 32–35 includes instructions having the same latencies and that are the same type (e.g., all memory instructions, all ALU instructions, etc), execution resources and writeback resources for their instructions are always available.

For example, memory scheduler 32 dispatches only four-cycle memory instructions. Memory scheduler 32 will always wait at least four cycles between dispatching a first instruction and a second instruction when the second instruction is dependent on the first instruction. With no dependencies, memory scheduler 32 can schedule memory instructions on every clock cycle so that the memory execution unit is fully pipelined. Therefore, in the memory execution unit pipeline, there will be no writeback conflicts, and the memory execution resources are always available. This allows schedulers 32–35 to be simplified because the availability of writeback resources and execution resources does not have to be determined.

However, schedulers 32–36 must determine the availability of data resources before dispatching instructions. In order to determine data resource availability, one scheduler may have to receive information from another scheduler before dispatching an instruction. For example, if ALU scheduler 33 has an add instruction that is dependent on a load instruction in memory scheduler 32, the add instruction cannot be dispatched until at least four clock cycles after the load instruction is dispatched because the load instruction has a latency of four. Therefore, ALU scheduler 33 must determine when the load instruction was dispatch before dispatching the add instruction. Ideally, ALU scheduler 33 should dispatch the add instruction exactly four clock cycles after the load instruction is dispatched. If ALU scheduler 33 waits more than four clock cycles, the processing speed of processor 10 will be decreased because clock cycles will be wasted. Therefore, schedulers 32–36 must interact with each other in order to optimize the scheduling of instructions, and to allow one scheduler to see the other schedulers' results.

Figure 2:
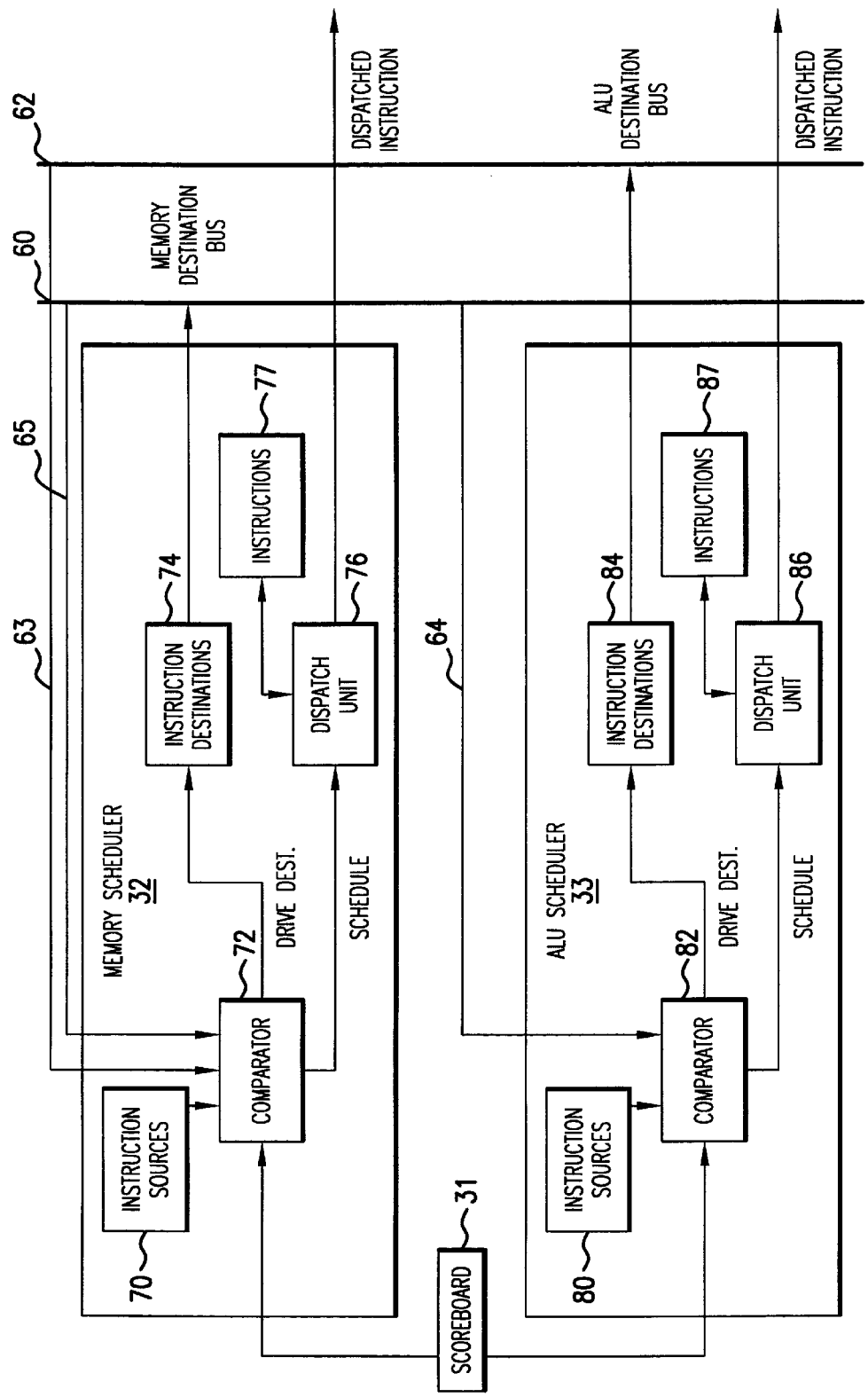
FIG. 2 is a block diagram illustrating in more detail two of the schedulers in accordance with one embodiment of the present invention.

FIG. 2 is a block diagram illustrating in more detail schedulers 32 and 33, including the interconnection between schedulers 32 and 33 that allow the schedulers to interact with each other. Although only schedulers 32 and 33 are shown in FIG. 2, each scheduler 32–36 is interconnected is a similar manner.

Memory scheduler 32 includes a dispatch unit 76 coupled to an instruction queue 77 which holds the instructions to be scheduled. In one embodiment, instruction queue 77 holds eight instructions at a time. Dispatch unit 76 receives a "schedule" signal for an instruction. Dispatch unit 76 then reads the instruction from instruction queue 77, and dispatches the instruction to an execution unit.

Memory scheduler 32 further includes an instruction sources unit 70 that stores the sources for each instruction stored in instruction queue 77. In addition, memory scheduler 32 includes an instruction destinations unit 74 that stores the destinations for each instruction stored in instruction queue 77.

Instruction destinations unit 74 is coupled to a memory destination bus 60. Instruction destinations unit 74 receives a "drive destination" signal identifying a scheduled instruction. In response, instruction destinations unit 74 outputs the destination of that instruction to memory destination bus 60.

Memory destination bus 60 is coupled to the other schedulers in scheduler unit 30, including ALU scheduler 33 via line 64. The instruction destination is therefore broadcast to all schedulers in scheduler unit 30. When a scheduler receives a destination from memory destination bus 60, the scheduler knows that the destination will be ready and valid after the latency of the instruction has expired (e.g., after four clock cycles for a memory instruction). Memory destination bus 60 is also coupled to comparator 72 in memory scheduler 32 via line 65.

Similar to memory scheduler 32, ALU scheduler 33 includes instruction sources unit 80, instruction destinations unit 84, instruction queue 87 and dispatch unit 86. Instruction destinations unit 84 outputs the destination of an ALU instruction to ALU destination bus 62 which is coupled to the other schedulers in scheduler unit 30, including memory scheduler 32 via line 63.

When a destination is output on ALU destination bus 62, the destination is received by a comparator 72 in memory scheduler 32. Comparator 72 compares the received destination with the instruction sources in instruction sources unit 70. Comparator 72 also can determine from scoreboard 31 which sources are ready at the time the instruction is written into memory scheduler 32. If both sources of the instruction are indicated to be ready by scoreboard 31, the instruction is ready to be dispatched. Otherwise, before an instruction is dispatched by memory scheduler 32, one or both sources of that instruction must match the destination received on line 63.

Comparator 72 constantly compares the instruction sources in instruction sources 70 with the destination received on line 63. Comparator 72 determines that an instruction is ready to be scheduled by determining whether the two sources required by an instruction are valid based on the received destination and scoreboard 31. When an instruction is ready, comparator 72 schedules the instruction by outputting the "schedule" signal to dispatch unit 76. Comparator also outputs the "drive destination" signal to instructions destination 74. If more than one instruction is ready, comparator 72 schedules the first ready instruction in one embodiment, the oldest ready instruction in another embodiment, or one of the instructions based on a predetermined algorithm in another embodiment.

ALU scheduler 33 also includes a comparator 82 that functions in an identical manner as comparator 72. Comparator 82 uses the destination received on line 64.

Schedulers 32–36 are tuned with respect to each other to allow optimal back-to-back execution of instructions. For example, memory scheduler 32 is tuned relative to ALU scheduler 33 so that a back-to-back dispatch of an ALU instruction followed by a dependent memory instruction has the proper spacing and latency. The schedulers are tuned by skewing the latencies relative to each other. Skewing is achieved by staging functions of the scheduling pipeline.

Figure 3:
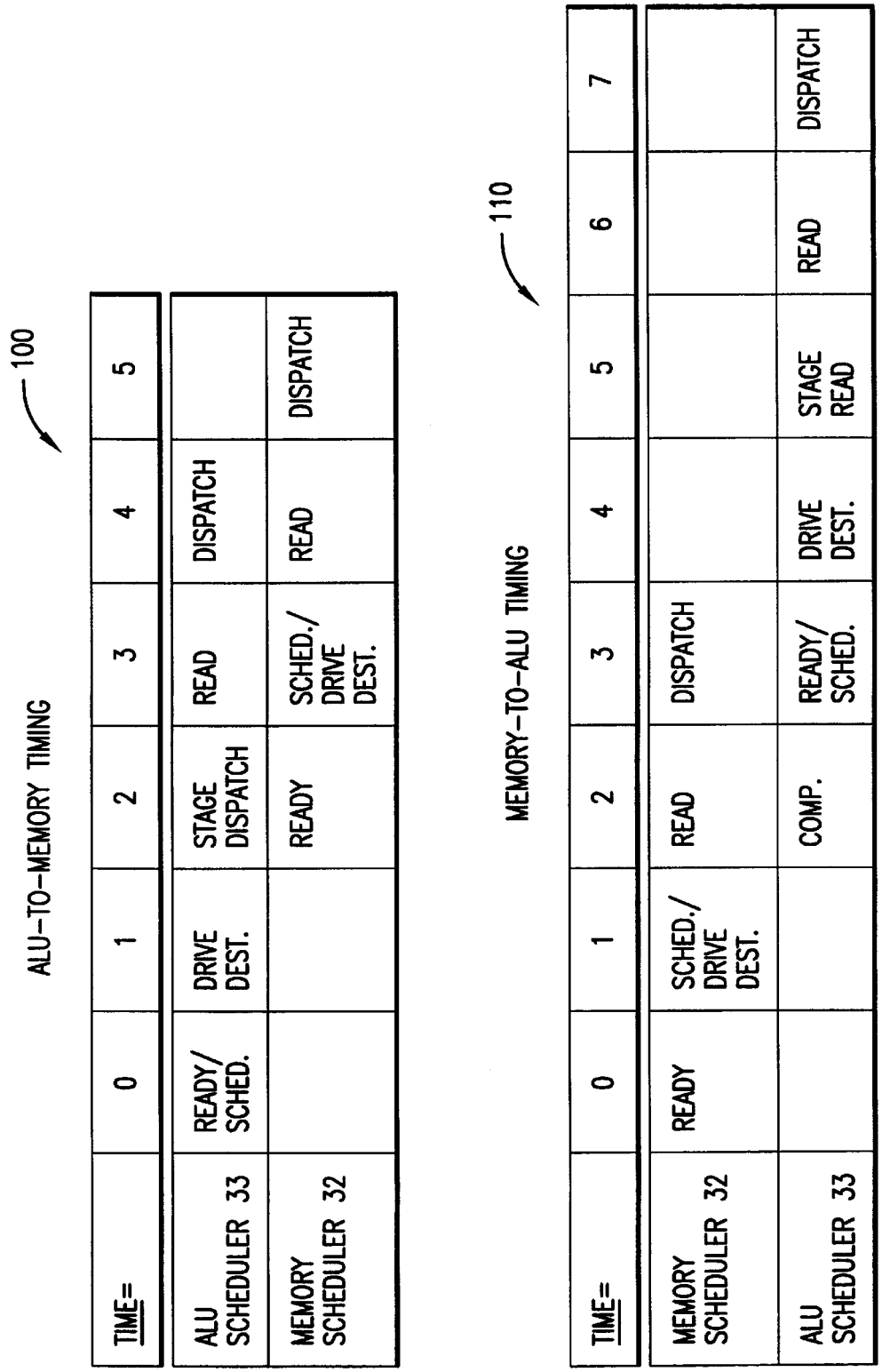
FIG. 3 contains timing diagrams illustrating the timing of some back-to-back instructions in accordance with one embodiment of the present invention.

FIG. 3 contains timing diagrams illustrating the timing of some back-to-back instructions in accordance with one embodiment of the present invention. Timing diagram 100 is the timing for an ALU instruction followed by a dependent memory instruction. The ALU instruction is dispatched by ALU scheduler 33 and the memory instruction is dispatched by memory scheduler 32.

At time=0 of timing diagram 100, an ALU instruction becomes ready. In response, comparator 82 of ALU scheduler 33 sends a schedule signal to dispatch unit 86.

At time=1, comparator 82 sends a drive destination signal to instruction destinations 84. As a result of receiving the drive destination signal, instruction destinations 84 outputs the destination of the ALU instruction to ALU destination bus 62. The destination is received by comparator 72 of memory scheduler 32.

At time=2, dispatch unit 82 of ALU scheduler 33 stages the dispatch operation one clock cycle. Meanwhile, comparator 72 of memory scheduler 32 determines that the dependent memory instruction is ready based on the destination received on line 63.

At time=3, dispatch unit 86 of ALU scheduler 33 reads the ALU instruction from instruction queue 87. In memory scheduler 32, comparator 72 sends a schedule signal to dispatch unit 76, and sends a drive destination signal to instruction destinations 74. As a result of receiving the drive destination signal, instruction destinations 74 outputs the destination of the memory instruction to memory destination bus 60.

At time=4, dispatch unit 86 of ALU scheduler 33 dispatches the ALU instruction to an ALU execution unit. Further, dispatch unit 76 of memory scheduler 32 reads the memory instruction from instruction queue 77.

Finally, at time=5, in memory scheduler 32, dispatch unit 76 dispatches the memory instruction to a memory execution unit.

As shown in timing diagram 100, in ALU scheduler 33 there is a four cycle delay between schedule and dispatch. In contrast, in memory scheduler 32 there is only a two cycle delay between scheduler and dispatch. The extra two cycles added to ALU scheduler 33 is an example of tuning ALU scheduler 33 by adding skew. For optimal scheduling, the memory instruction should be dispatched exactly one clock cycle after the ALU instruction is dispatched, which is the latency of the ALU instruction. Without tuning ALU scheduler 33, the operations performed during time=1, 2 and 3 would all have to be performed on a single cycle to maintain the optimal scheduling, which would not be feasible.

Timing diagram 110 is the timing for a memory instruction followed by a dependent ALU instruction. The memory instruction is dispatched by memory scheduler 32, and the ALU instruction is dispatched by ALU scheduler 33.

At time=0 of timing diagram 110, a memory instruction becomes ready. At time=1, comparator 72 sends a schedule signal to dispatch unit 76, and sends a drive destination signal to instruction destinations 74. As a result of receiving the drive destination signal, instruction destinations 74 outputs the destination of the memory instruction to memory destination bus 60. The destination is received by comparator 82 of ALU scheduler 33.

At time=2, dispatch unit 76 of memory scheduler 32 reads the instruction from instruction queue 77. Meanwhile, in ALU scheduler 33, comparator 82 compares the received destination with the sources in instruction sources 80.

At time=3, in memory scheduler 32 dispatch unit 76 dispatches the memory instruction to a memory execution unit. In ALU scheduler 33, comparator 82 determines that the dependent ALU instruction is ready based on the received destination. Comparator 82 then outputs a schedule signal for that instruction.

At time=4, comparator 82 in ALU scheduler 33 outputs a drive destination signal to instruction destinations 84 which outputs the destination to ALU destination bus 62.

At time=5, dispatch unit 86 in ALU scheduler 33 stages the read operation. This is an example of skewing the ALU scheduler 33 pipeline. By staging the read operation, the read operation is delayed one clock cycle.

At time=6, dispatch unit 86 of ALU scheduler 33 reads the ALU instruction from instruction queue 87. At time=7, dispatch unit 86 dispatches the ALU instruction to an ALU execution unit.

As shown in timing diagram 110, the ALU instruction is dispatched exactly four clock cycles after the memory instruction is dispatched, which is the latency of the memory instruction. Therefore, the skew added to ALU scheduler 33 to allow back-to-back execution of an ALU instruction and a dependent memory instruction shown in timing diagram 100 has also allowed the back-to-back execution of a memory instruction and a dependent ALU instruction to be dispatched with the proper latency.

As described, in the present invention separate schedulers each dispatch instructions having the same latency and functionality. Therefore, the schedulers can dispatch instructions based primarily on the availability of data resources, and generally do not have to determine the availability of execution resources and writeback resources. Further, the schedulers are interconnected and skewed so that the scheduling of back-to-back instructions by different schedulers can be optimized. By having instruction-specific schedulers, each scheduler can be smaller in size than known schedulers. Further, the associated logic for each scheduler to perform functions such as back-to-back scheduling within the same scheduler, and load/store ordering, can be simplified.

Several embodiments of the present invention are specifically illustrated and/or described herein. However, it will be appreciated that modifications and variations of the present invention are covered by the above teachings and are within the purview of the appended claims without departing from the spirit and intended scope of the invention.

For example, although five separate schedulers are described, any number can be used. Further, the instructions are not required to be separated in an instruction queue. However, each scheduler must somehow receive the type of instructions that the scheduler is adapted to dispatch.

What is claimed is:

1. A computer processor comprising:
a first scheduler adapted to dispatch a first type of computer instructions;
a second scheduler coupled to said first scheduler and adapted to dispatch a second type of computer instructions;
a first scheduler destination bus coupled to said first scheduler and said second scheduler; and
an instruction queue coupled to said first and second scheduler, said instruction queue comprising a memory queue and a general queue, wherein said general queue is shared by a plurality of arithmetic units;
wherein said first scheduler outputs a destination of each first type of computer instructions that is dispatched to said first scheduler destination bus;
wherein said first type of instructions are a different type than said second type of instructions; and
wherein said first type of instructions each have identical latency, and said second type of instructions each have identical latency.

2. The computer processor of claim 1, wherein said first type of computer instructions are memory instructions and wherein said second type of computer instructions are arithmetic logic unit instructions.

3. The processor of claim 1, wherein said second scheduler is adapted to dispatch said second type of instructions based on said destination.

4. The processor of claim 1, further comprising:
a first execution unit coupled to said first scheduler; and
a second execution unit coupled to said second scheduler.

5. The processor of claim 1, wherein said first scheduler is skewed relative to said second scheduler so that when said first scheduler dispatches one of said first type of computer instructions having a first latency, said second scheduler will dispatch one of said second type of computer instructions that is dependent on said one of said first type of computer instruction at a time equal to said first latency.

6. The processor of claim 1, wherein said first type of instructions and said second type of instructions are micro-operations.

7. A method of dispatching a plurality of computer instructions comprising the steps of:
(a) partitioning the instructions into first type of instructions and second type of instructions;
(a1) storing the first type of instructions in a memory queue and the second type of instructions in a general queue, wherein said general queue is shared by a plurality of arithmetic units;
(b) sending the first type of instructions to a first scheduler;
(c) sending the second type of instructions to a second scheduler;
(d) determining whether a first source of one of the first scheduler instructions is ready;
(e) dispatching the one of the first scheduler instructions if the first source is ready; and
(f) outputting a destination of the one of the first scheduler instructions to a destination bus;
wherein the first type of instructions are a different type than the second type of instructions; and
wherein said first type of instructions each have identical latency, and said second type of instructions each have identical latency.

8. The method claim 7, wherein step (d) comprises the step of receiving a register status from a scoreboard.

9. The method of claim 7, further comprising the steps of:
(g) determining whether a second source of one of the second scheduler instructions is ready; and
(h) dispatching the one of the second scheduler instructions if the second source is ready;
wherein step (g) comprises the step of receiving the destination from the destination bus.

10. The method of claim 7, further comprising the step of:
(d) dispatching one of the first type of instructions and one of the second type of instructions that is dependent on the one of the first type of instructions;
wherein said first scheduler is skewed relative to said second scheduler so that when the first scheduler dispatches the one of said first type of computer instructions, said second scheduler will dispatch the one of said second type of computer instructions at a time equal to the first latency.

11. A computer system comprising:
a bus;
a memory coupled to said bus to store instructions of a first type and a second type; and
a processor coupled to said bus;
wherein said processor comprises:
a first scheduler adapted to dispatch said first type of computer instructions; and
a second scheduler coupled to said first scheduler and adapted to dispatch said second type of computer instructions;
a first scheduler destination bus coupled to said first scheduler and said second scheduler; and
an instruction queue coupled to said first and second scheduler, said instruction queue comprising a memory queue and a general queue, wherein said general queue is shared by a plurality of arithmetic units;
wherein said first scheduler outputs a destination of each first type of computer instructions that is dispatched to said first scheduler destination bus;
wherein said first type of instructions are a different type than said second type of instructions; and
wherein said first type of instructions each have identical latency, and said second type of instructions each have identical latency.

12. The computer system of claim 11, wherein said first type of computer instructions are memory instructions and wherein said second type of computer instructions are arithmetic logic unit instructions.

13. The computer system of claim 11, wherein said second scheduler is adapted to dispatch said second type of instructions based on said destination.

14. The computer system of claim 11, further comprising:
a first execution unit coupled to said first scheduler; and
a second execution unit coupled to said second scheduler.

15. The computer system of claim 11, wherein said first scheduler is skewed relative to said second scheduler so that when said first scheduler dispatches one of said first type of computer instructions having a first latency, said second scheduler will dispatch one of said second type of computer instructions that is dependent on said one of said first type of computer instruction at a time equal to said first latency.

16. A computer processor comprising:
an instruction queue comprising a memory queue and a general queue, wherein said general queue is shared by a plurality of arithmetic units;
a scheduler unit having a plurality of specific schedulers, each of said specific schedulers scheduling instructions that have identical latency and the same function, and having a general scheduler, said general scheduler scheduling instructions having different latencies;
a plurality of execution units coupled to said scheduler; and
a destination bus coupled to said specific schedulers.

17. The computer processor of claim 16, wherein one of said plurality of schedulers comprises:
a comparator;
a dispatch unit coupled to said comparator;
an instructions destinations unit coupled to said comparator; and
an instructions sources unit coupled to said comparator.

* * * * *